United States Patent
Neuvirth et al.

(10) Patent No.: US 11,223,637 B2
(45) Date of Patent: Jan. 11, 2022

(54) DETECTING ATTACKS ON WEB APPLICATIONS USING SERVER LOGS

(71) Applicant: MICROSOFT TECHNOLOGY LICENSING, LLC, Redmond, WA (US)

(72) Inventors: Hani Hana Neuvirth, Redmond, WA (US); Ram Haim Pliskin, Rishon Lezion (IL); Tomer Koren, Tel Aviv (IL); Josef Weizman, Halfa (IL); Karl William Reinsch, Snoqualmie, WA (US); Efim Hudis, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 453 days.

(21) Appl. No.: 15/863,956

(22) Filed: Jan. 7, 2018

(65) Prior Publication Data
US 2019/0215330 A1     Jul. 11, 2019

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1408* (2013.01); *H04L 63/1416* (2013.01); *H04L 63/1433* (2013.01); *H04L 63/168* (2013.01)

(58) Field of Classification Search
CPC ............ H04L 63/1425; H04L 63/1408; H04L 63/1458; H04L 63/1416; H04L 63/1433; H04L 63/168; H04L 2463/146; H04L 29/06904; G06F 21/554; G06F 21/55; G06N 20/00
See application file for complete search history.

(56) References Cited

U.S. PATENT DOCUMENTS

| | | | |
|---|---|---|---|
| 10,104,113 B1 * | 10/2018 | Stein | H04L 63/1433 |
| 2005/0188080 A1 * | 8/2005 | Motsinger | H04L 67/22 709/224 |
| 2009/0187989 A1 * | 7/2009 | Kim | G06F 21/552 726/23 |

(Continued)

OTHER PUBLICATIONS

"Owasp-modsecurity-crs", Retrieved From <<https://github.com/SpiderLabs/owasp-modsecurity-crs/tree/v3.0/master/rules>>, Retrieved On: Dec. 13, 2017, 2 Pages.

*Primary Examiner* — Yogesh Paliwal
(74) *Attorney, Agent, or Firm* — Rainier Patents, P.S.

(57) ABSTRACT

A previously-unknown type of attack on a web application can be detected dynamically using server logs. An alert can be raised for an application that returns a valid response to the potential attacker (e.g., when an http (hypertext transfer protocol) status code of 200 is returned to the requestor). Server logs can be analyzed to identify an external computer that uses the same attack methodology on multiple targets. The external computer may attempt to access the same Uniform Resource Identifier (URI) on various web sites. In many cases, the http status code that is returned is an error code. Characteristics such as but not limited to fast crawling and numerous error status codes being returned to a particular requestor can be used by a machine learning (ML) system to identify potentially malicious external computing devices and/or vulnerable URIs.

20 Claims, 4 Drawing Sheets

(56) References Cited

U.S. PATENT DOCUMENTS

| | | | |
|---|---|---|---|
| 2013/0104230 A1* | 4/2013 | Tang | G06F 21/552 |
| | | | 726/23 |
| 2014/0317741 A1* | 10/2014 | Be'ery | H04L 63/14 |
| | | | 726/23 |
| 2015/0128263 A1* | 5/2015 | Raugas | G06N 7/005 |
| | | | 726/23 |
| 2017/0353991 A1* | 12/2017 | Tapia | H04L 41/0631 |
| 2018/0091540 A1* | 3/2018 | Solow | H04L 63/0227 |

* cited by examiner

DETECTING ATTACKS ON WEB APPLICATIONS USING SERVER LOGS

BACKGROUND

Vulnerabilities in web applications are frequently targeted by attackers. One common type of attack is a brute force attack on login pages. For example, an attacker may make a series of guesses about usernames and/or passwords and observe the system's response to determine if a guess was correct. Another common type of attack is code injection, in which code inserted into a computer program changes the execution of the program, with potentially disastrous results. Other types of attacks are also known and new ones continue to be developed.

A web application firewall monitors and controls incoming and outgoing network traffic based on specified security rules. A firewall can be a network firewall or a host-based firewall. A network firewall filters traffic between networks. A host-based firewall runs on a host computer (e.g., web application server) and controls network traffic in and out of the host computer. A web application firewall is a firewall that monitors traffic in and out of a web application.

SUMMARY

A previously-unknown type of attack on a web application can be detected dynamically using server logs. An alert can be raised for an application that returns a valid response to the potential attacker (e.g., when an http (hypertext transfer protocol) status code of 200 is returned to the requestor). A web application can be protected from previously-unknown types of attacks based on features extracted at the http level logs of the web server.

Server logs can be analyzed to identify an external computer that uses the same attack methodology on multiple targets. For example, the external computer may attempt to access the same Uniform Resource Identifier (URI) on various web sites. This type of attacker typically exhibits a pattern of crawling to the same web page on many different web sites, searching for a particular vulnerability. In many cases, the http status code that is returned is an error code because the requested page does not exist or because security software blocks the request. The security software may block the request because it determines that the requestor is likely to be a malicious actor because of the quantity of similar requests made by the same computer. When the requested page does not exist, an http error status code in the 400s is typically returned, indicating that an error appears to have been made by the requestor in the http request.

Characteristics such as but not limited to crawling to a particular web page but not doing anything there (called fast crawling) and numerous error status codes being returned to a particular requestor can be used by a machine learning (ML) system to identify potentially malicious external computing devices and/or vulnerable URIs. An alert can be raised for an application that returns a valid response to the potential attacker (e.g., when an http status code of 200 is returned to the requestor).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
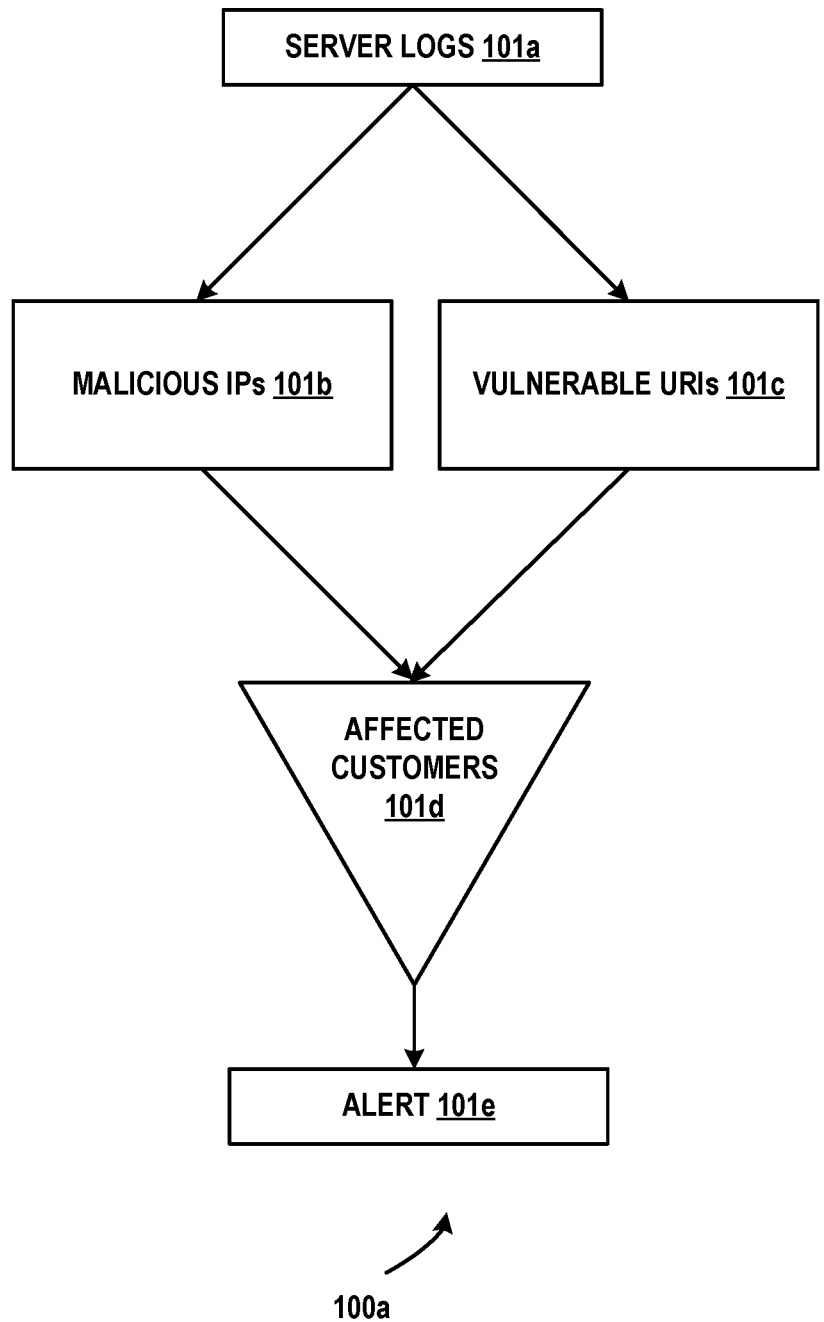
FIG. 1a is a block diagram 100a representing an architectural overview of a system that detects attacks on web applications using server logs in accordance with aspects of the subject matter disclosed herein.

A computer system that provides services, especially a system connected to a public network, can be the subject of attack. The purpose of the attack may be to gain unauthorized access to the service, to disrupt the service, to corrupt or steal data or to accomplish various other malicious deeds. A web application firewall typically uses rule-based logic to detect and prevent attacks. Web application firewalls are effective for known and common attacks, but fail to detect new (previously-unknown) types of attacks. That is, traditionally, first someone (a human) identifies a new type of attack, determines how it works and then develops rules to counter the attack. Thus, a new type of attack is detected after-the-fact. It cannot be detected automatically (programmatically), as it occurs. The way the attack works has to be figured out in order to develop rules that will prevent the attack.

In contrast, as described more fully below, the subject matter disclosed herein programmatically detects attacks that have not been previously identified so that the first time an attack occurs, it can be detected programmatically from the network patterns observed. An alert (e.g., to the owner of the web application) can be generated and sent. All of the details of how the attack occurs do not need to be understood before the attack is detected and an alert is generated. The new type of attack can be detected while it is happening (dynamically). The detection software can be run periodically, (e.g., hourly, or at any specified time period) so that the alert can be generated and sent essentially immediately. The alert can be sent to a security center to which the owner of the web application can log in to receive alerts, by email, text message or in any other suitable way.

A machine learning (ML) system as disclosed herein can detect previously-unknown types of attacks on web applications using web server logs. By using server logs from different web applications, external devices that apply the same type of attack on multiple web applications can be identified.

Typical behavioral patterns associated with a particular type of attack can be identified because the attacker may be searching for a particular vulnerability. For example, an attacker may access the same URI prefix on multiple applications looking for a particular vulnerability. Thus, fast crawling to the same web page on many different web sites is a behavioral pattern associated with the type of attack that exploits the vulnerability associated with the URI. Fast crawling refers to a behavior in which, unlike a human who navigates to a page to perform some action (such as to buy a book on Amazon.com), a script executes that navigates to URI after URI without initiating further actions associated with the location. Often the http status code returned indicates an error because the requested page does not exist on some of the attacked applications. Often the request will be blocked by existing security software because the security software has detected that many access attempts to the page were made by the attacker. Hence, many http status codes indicating that the URI does not exist is a behavioral pattern associated with an attack. The machine learning system can identify malicious external IPs, and/or vulnerable URIs, and raise alerts for those customers that return a valid response to the attacker (e.g., http status code=200).

Machine learning enables computers to use existing data to forecast future behaviors, outcomes, and trends. Using machine learning, computers "learn" without being explicitly programmed. In machine learning systems, typically there is a training phase and a prediction phase. In supervised machine learning, a number of training examples or data points associated with particular outcomes are provided to the machine learning system. The machine learning system finds relationships between patterns in the training data and the outcomes. Supervised machine learning systems are trained with labeled data. Labeled data is data comprised of examples of the answers wanted. For example, a model that identifies fraudulent credit card use may be trained from a data set in which known fraudulent transactions are labeled "fraudulent" and transactions known to be legitimate are labeled "legitimate". In the training phase, the computer system determines underlying commonalities among the fraudulent transactions and underlying commonalities among the legitimate transactions so that the trained system can predict whether a received transaction is likely to be fraudulent or legitimate. Typically, the labeled training data is divided into two groups of transactions, one of which is used to train the ML system and the other of which is used to evaluate the prediction accuracy of the trained ML system. Once the machine learning system has been trained to achieve a particular level of accuracy, the trained system can be used to make predictions.

A Uniform Resource Identifier (URI) is a string of characters that identifies a resource. A URI enables interaction with the resource over a network. A common type of URI is the Uniform Resource Locator (URL), or web address, that provides a method for finding the resource by specifying both an access mechanism and network location. For example, the URL http://example.org/website/Main_Page refers to a resource identified as/website/Main_Page whose representation, in the form of HTML and related code, is obtainable via the http protocol from a network host whose domain name is example.org.

In accordance with aspects of the subject matter disclosed herein, known vulnerable URIs can be labeled "vulnerable". The set of known vulnerable URIs used can be or can include the set of URIs provided by the Open Web Application Security Project (OWASP) at https://github.com/SpiderLabs/owasp-modsecurity-crs/tree/v3.0/master/rules). All other URIs can be labeled "non-vulnerable". For each requestor, the number of different web sites on which the requestor accessed a URI can be calculated. The URI accessed the greatest number of times on the greatest number of different web sites can be labeled the "top URI". If the top URI is a vulnerable URI, the computing device that accessed it can be labeled as malicious if the computing device accessed that URI on more than a specified number of web sites (e.g., if computing device accessed the URI on more than 5 different web sites.) Computing devices that do not fit these criteria are labeled non-malicious. Computing devices whose top URI is not in the sensitive list can be labeled non-malicious. Computing devices that accessed its top URI on more than a specified quantity (e.g., 500 or 1000, etc.) web sites within the analyzed hour can be labeled non-malicious because a URI that is accessed extremely frequently is more likely to be a particularly popular site rather than a site that is under attack or vulnerable.

A feature characterizes some aspect correlated with the label (e.g., malicious or benign computing device for the IP ML system, sensitive or not sensitive URI for the URI ML system.) A feature is a property on which predictions are based. The selected features of the ML system encapsulate the behavior of accessing a small number of URIs over many different web sites, returning many unsuccessful http status codes. In accordance with some aspects of the subject matter described herein, the features selected by the ML system can include one or more of: port scanning patterns, http response status codes, entropy of the character distribution of the web site names, existence of a referrer page and the user-agent of the http request. In the prediction phase, the URI information is not used (as it is not one of the selected features). For each entry in the server's log for which an http status of 200 is returned (i.e., a successful request), the IP ML system can predict if the external computing device that initiated the request is malicious or not malicious. The URI ML system can predict if the accessed URI is vulnerable or not vulnerable. If the scores returned by each ML system exceed a specified threshold or threshold, an alert can be generated. The alert can be made available to the owner of the web application.

Detecting Attacks on Web Applications Using Server Logs

FIG. 1a is a block diagram representing an architectural overview 100a in accordance with aspects of the subject matter described herein. Server logs such as server logs 101a can be all the server logs or some portion of the server logs received at one or more web servers for all the web applications or for some portion of the web applications hosted on one or more web servers. The server logs can include http requests for a quantity of web applications hosted on the one or more web servers. Each entry in a server log can represent an access to a web application hosted on a web server. The entry can include the path to the server that the external computing device accessed.

Each server log entry may include one or more of the following bits of information: the URI accessed (the parameters associated with the accessed URI may be excluded), the client identifier (e.g., the client identifier may be an obfuscated identifier such as the IP address of the computing device issuing the http request, e.g., 123.45.67.000), the http request status (e.g., an http request code such as a code in the 400s indicating an invalid request or a code such as http status code 200 indicating a valid request, etc.), a user agent, and/or referring page.

The server logs can be filtered to remove internal requests (leaving only external requests) because requests made by the web server (internal requests) are assumed to be non-malicious. The server logs can be filtered to remove certain specified IP addresses that are known to be non-malicious entities. The server log entries that are analyzed and used to train and evaluate the vulnerable URI ML system 101c can be those entries in which an attempt is made to access a URI on at least a specified quantity (e.g., at least 5) different web sites within an hour or some specified time period. A URI can be considered to be sensitive if it meets certain specified criteria. Contemplated criteria include appearance of the URI in a list of high-risk keywords of Unix-shell and restricted files used by open source web application firewalls or identified by the Open Web Application Security Project (OWASP), an online community that produces articles, methodologies, documentation, tools, and technologies in the field of web application security. Contemplated criteria can include any entry that includes certain words such as "admin" or "login", etc. Any URI meeting these criteria can be labeled "vulnerable".

The server log entries that are analyzed and used to train and evaluate the malicious IPs system 101b can be filtered to remove requests to access low-risk URIs. A low-risk URI can be defined as a URI that was accessed by a large number (e.g., at least 1000 different requestors) within the analyzed hour. Among the remaining population of server log entries, devices that connected a particular non-low-risk URI on at least 5 different web sites can be analyzed. A computing device (or for short, "IP") can be labeled malicious if the IP address does not belong to the web application, is not associated with the hosted web application or is unknown and if the computing device accessed at least 5 sensitive URIs on different web sites. A computer device can be labeled non-malicious if the computing device did not access any sensitive URIs.

Unlabeled entries can be excluded from analysis and use for training or evaluation. In accordance with some aspects of the subject matter disclosed herein, the server logs may be analyzed hourly or at some specified time period. The server logs can be provided to a machine learning system to train the system to identify malicious requestors. The server logs can be provided to a second machine learning system to train the system to identify sensitive (vulnerable) URIs. All the URIs appearing in the server logs can be analyzed.

Feature extraction refers to developing derived values (features) that facilitate subsequent learning and generalization. Feature extraction reduces a large amount of data suspected to be redundant in nature to a smaller set of features (a feature vector). Determining a subset of the initial features is called feature selection. The selected features are expected to include the relevant information from the input data, so that the desired task can be performed by using this reduced representation instead of the complete set of initial data.

In accordance with aspects of the subject matter disclosed herein, features derived for both ML systems can include port scanning patterns. Port scanning is designed to probe a server or host for open ports. Port scanning is done legitimately by administrators to verify security policies of their networks. Port scanning is also done by attackers to identify network services running on a host and exploit vulnerabilities. For example, a port scanning feature can be a kind of activity where a particular computing device attempts to access many different web sites and attempts to access a small set of URIs on the many different web sites. Once the specified URI on the web site is accessed, the port scanning requestor does not issue requests for other pages but instead attempts to probe for a vulnerability and then goes on to search the next web site. This is called fast crawling (accessing a large number of web sites, and a small quantity of particular URIs on the web sites). When an attacker attempts this type of port scanning, the attacker typically does not know if the URI exists or not on a particular web site. Hence many http status errors (e.g., such as "page not found") are likely to be returned, indicating automatic scanning is taking place as opposed to a human interacting with a web site. Many http status code error responses is another feature that can be used in both ML systems.

Another feature selected for both ML systems include the entropy of the character distribution of the web site names.

The entropy of the character distribution of the web site names is a measure of the web site names' similarity. This can happen when several web sites belong to the same customer. Another way to determine entropy is to find out if the website belongs to the same subscription or tenant. A subscription is a user account. Some users may have multiple subscriptions. Each company typically has its own subscription. Scanning accesses that access many subscriptions rather than just one imply malicious activity. In contrast, multiple accesses to just one subscription can indicate management of the subscription.

Other features are the existence of a referrer page and the user-agent of the request. User-agent is associated with the browser of the tool being used to reach the web site. Each version of the browser may have a similar but slightly different user-agent designation. Because an attacker typically uses a script and has to manually enter a string for the user-agent, the attacker may make a mistake (e.g., a typographical error in the request). The attacker may try to look like a legitimate browser even though a browser is not being used. An attacker may also have a list of legitimate user-agents and may use one at random. Hence a pattern of always using the same user-agent, using a great many different user-agents or making a mistake in the user-agent field may be indicative of an attack. It will be appreciated that the URI itself and known sensitive keywords are not used as features so that a bias is not created to known sensitive URIs. This enables identification of new vulnerable URIs by the network patterns observed even if sensitive keywords are not used. In accordance with aspects of the subject matter disclosed herein, low variance features and low multiplicity features can be excluded. In accordance with some aspects of the subject matter disclosed herein, the ML systems can be trained using the gradient boosted trees technique.

Affected web application owners (affected customers 101d) can be those owners for whom a valid request for a web application was received, for which the request was for a sensitive URI and the requestor was determined to be likely to be a malicious requestor. An alert 101e can be generated and made available to the web application owner.

Figure 1B:
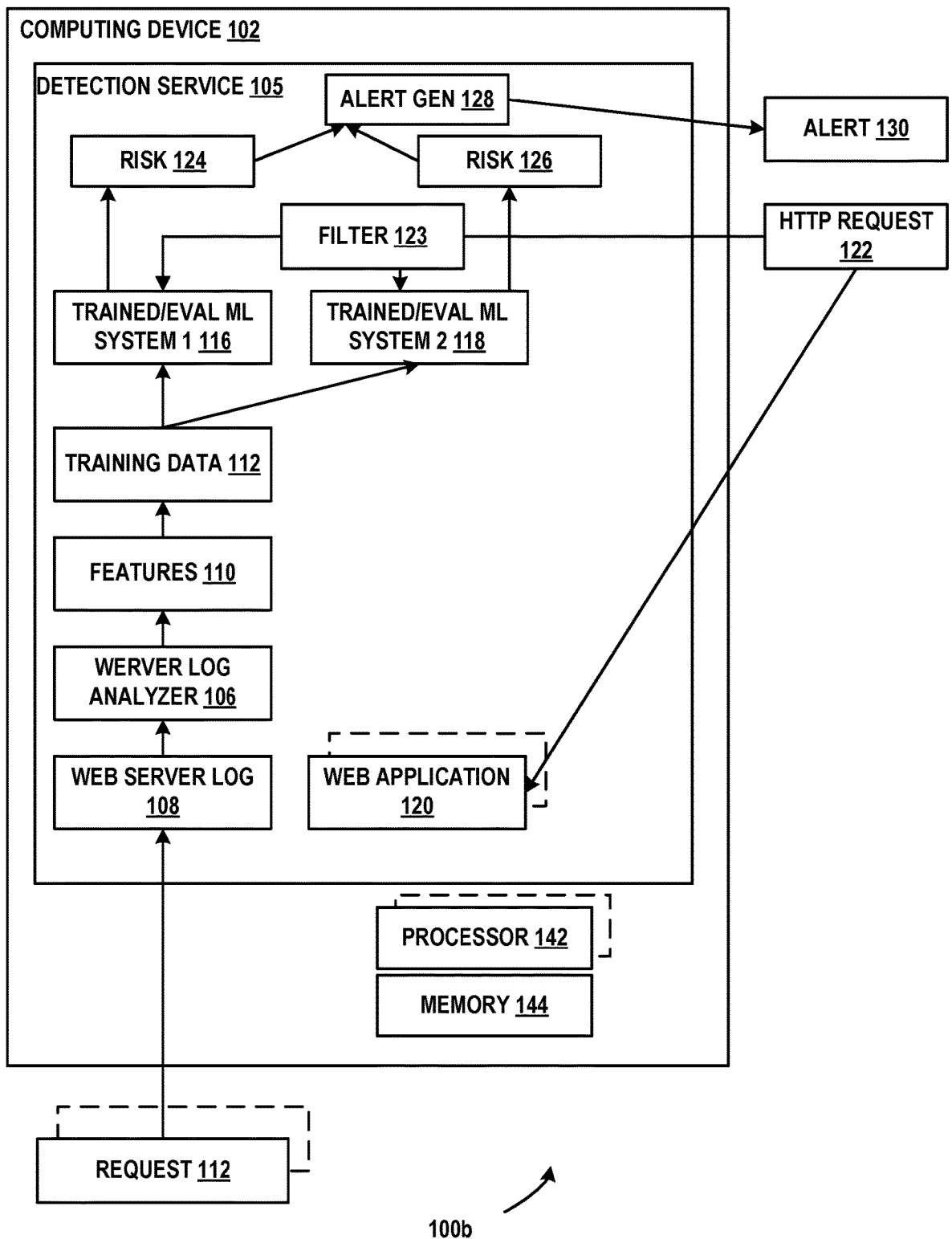
FIG. 1b is a block diagram 100b representing a system that detects attacks on web applications using server logs in accordance with aspects of the subject matter disclosed herein.

FIG. 1b is a block diagram representing a system 100b for detecting attacks on web applications using server logs in accordance with aspects of the subject matter disclosed herein. All or portions of system 100b may reside on one or more computers or computing devices such as the computers described below with respect to FIG. 3. System 100b or portions thereof may be provided as a stand-alone system or as a plug-in or add-in. System 100b or portions thereof may include information obtained from a service (e.g., in the cloud) or may operate in a cloud computing environment. Cloud computing enables access to shared pools of configurable system resources. It can also provide various services that can be set up rapidly with little effort. Sharing of resources provides economies of scale. Cloud computing enables an entity to focus on its actual business instead of having to provide its own computer infrastructure and maintenance. A cloud computing environment can be an environment in which computing services are not owned but are provided on demand. For example, information may reside on multiple devices in a networked cloud and/or data can be stored on multiple devices within the cloud. Cloud providers typically use a "pay-as-you-go" paradigm. In accordance with aspects of the subject matter disclosed herein, operating in a cloud computing environment provides the advantage of large quantities of data for analysis. It will be appreciated that finding network patterns indicating malicious behavior is enhanced by observation of network patterns accessing many different web applications on many different web servers.

System 100*b* can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors. Computing device 102 can be a web server.

System 100*b* may include one or more program modules which when loaded into the memory and accessed by the one or more processors configure the processor or processors to perform the actions attributed to the one or more program modules. System 100*b* can include a detection service 105 including one or more of: a server log analyzer such as server log analyzer 106 that receives a server log such as web server log 108 as described above. Http requests such as request 112, etc. or portions thereof can be stored in a web server log 108. Server log analyzer 106 can extract features such as features 110 as described above. Features 110 can include one or more of: port scanning patterns, http response status codes, entropy of the character distribution of the web site names, existence of a referrer page and the user-agent of the http request. Features 110 can be used to train a first ML system that detects malicious computing devices (which can be identified using the IP address of the computing device) and a second ML system that detects vulnerable URIs. The training data such as training data 112 can be labeled as described above.

As described above, the labeled training data can be divided into portions and a first portion of the labeled training data 112 can be used to train the two ML systems and a second portion 114 of the labeled training data can be used to evaluate the two ML systems to generate a first trained and evaluated ML system that predicts malicious IPs (trained/eval ML system 116) and a second trained and evaluated ML system that predicts vulnerable URIs (trained/eval ML system 2 118). Once the ML systems have been trained, the first ML system 116 can be used to predict the likelihood or risk 124 that a particular http request 122 accessing a particular web application such as web application 120 comes from a malicious computing device. The second ML system 118 can be used to predict the likelihood or risk126 that a particular http request122 accesses a vulnerable URI. The http request can be filtered using filter 123 which removes from consideration some http requests such as internal requests, etc. as described more fully above. Risk 124 and risk 126 can be received by an alert generator such as alert generator 128. Alert generator 128 can assess risk 124 and risk 126 and if it is determined that risk 124 and risk 126 exceed some specified thresholds in accordance with some algorithm, an alert such as alert 130 can be generated and made available to the owner of the web application accessed. As described more fully above, in accordance with some aspects of the subject matter disclosed herein, alerts can be generated only for requests for which a valid request http code (e.g., http status code 200) has been generated.

Figure 2:
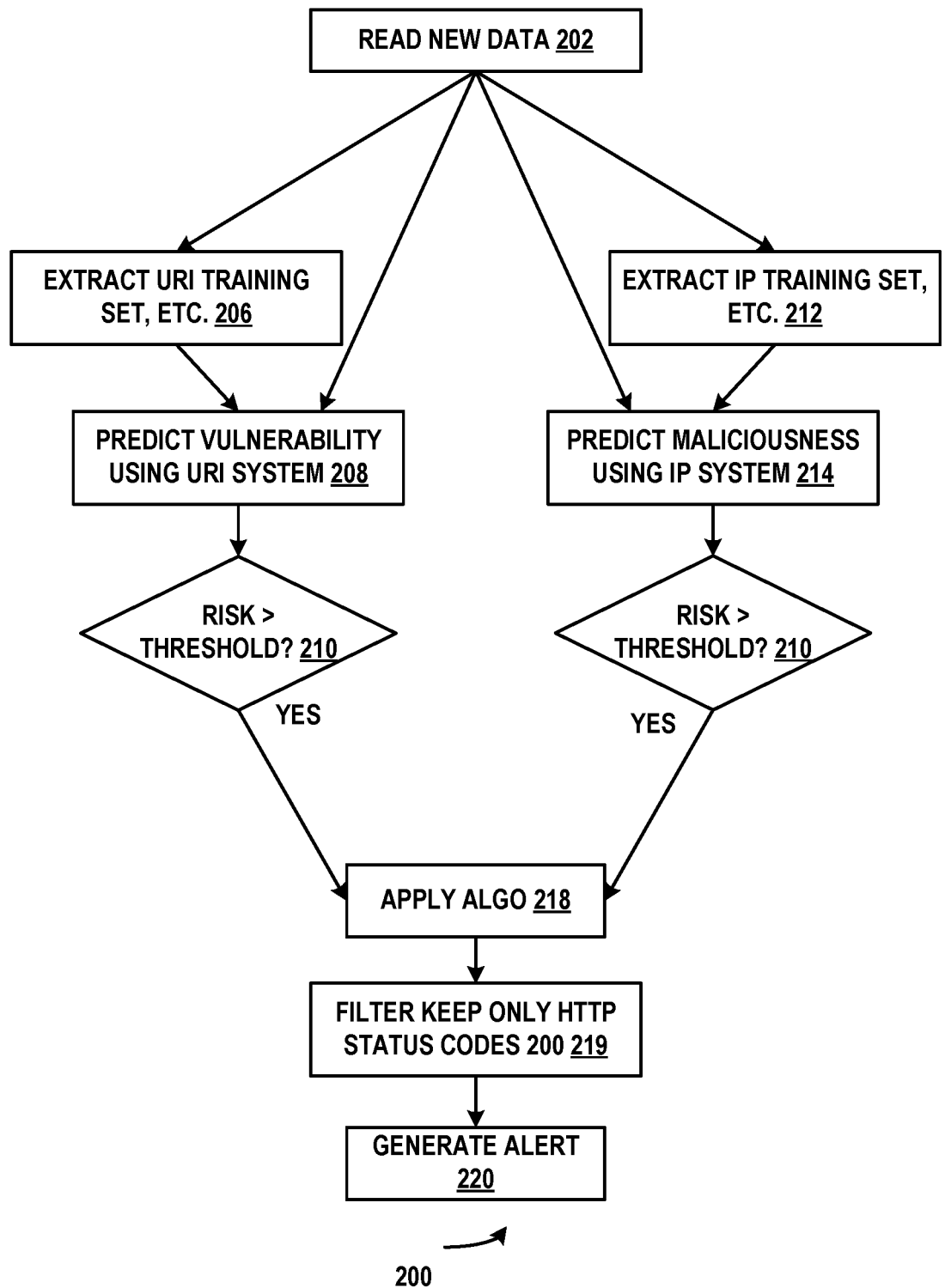
FIG. 2 illustrates an example of a method 200 for raising an alert in response to detecting an attack on a web application in accordance with aspects of the subject matter described herein.

FIG. 2 illustrates an example of a method 200 for generating an alert in accordance with aspect of the subject matter disclosed herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100*b* as describe by overview 100*a*.

At operation 202 one or more access requests can be received by the web server. The access requests can include the information described above. A URI training dataset can be extracted from historical data, labeled and used to train a ML system that can predict the vulnerability of the URI accessed as described above at operation 206. For each request, the vulnerability of the URI accessed in the request can be predicted at operation 208. At operation 210, the risk can be compared to a provided risk threshold. If the risk exceeds the threshold processing can continue at operation 218. At operation 212 a malicious device training dataset can be extracted from historical data, labeled and used to train a ML system that can predict the likelihood that the request originates from a malicious computing device at operation 212. For each request, the risk that the computing device originating the request is malicious can be predicted at operation 214. At operation 216, the risk can be compared to a provided risk threshold. If the risk exceeds the threshold processing can continue at operation 218 which applies the algorithm that determines if an alert is warranted. At operation 219 the one or more access requests can be filtered so that only those requests for which an http status code of 200 was returned are retained. At operation 220, an alert can be generated.

Example of a Suitable Computing Environment

Figure 3:
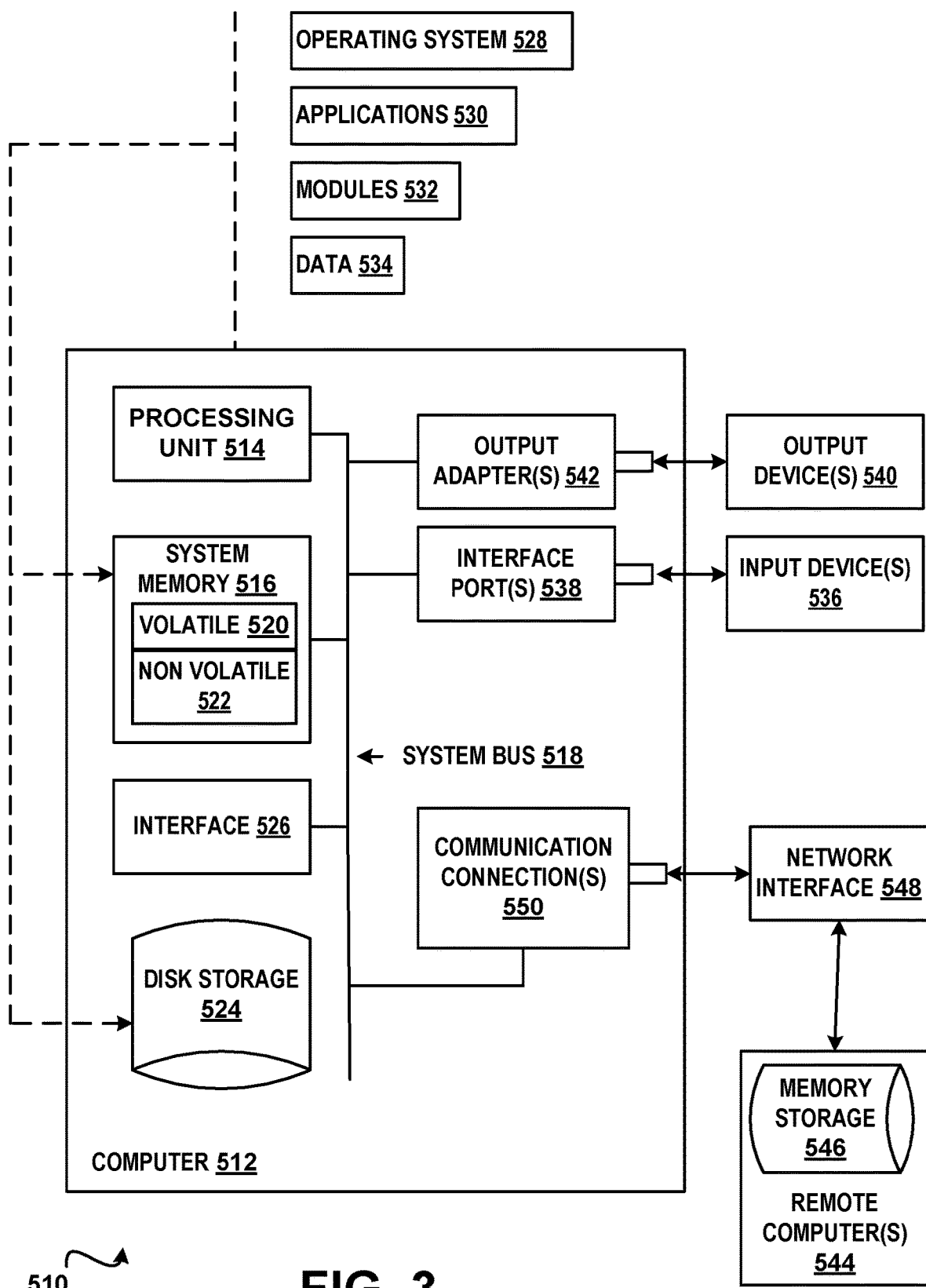
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a memory connected to a processor, the processor configured to train machine learning systems to detect a particular type of attack by:
extracting a first set of features from a server log, the first set of features being associated with one or more web application attacks by requesting computing devices identified as malicious;
using the first set of features to train a first machine learning system to output a first prediction of whether another requesting computing device is malicious;
extracting a second set of features from the server log, the second set of features being associated with resource identifiers used to access web applications identified as vulnerable; and
using the second set of features to train a second machine learning system to output a second prediction of whether another web application is vulnerable,
wherein at least one feature of the first set or the second set reflects entropy of character distribution of multiple web site names associated with a plurality of resource identifiers in the server log, the entropy reflecting relative similarity of respective web site names to other web site names.

2. The system of claim 1, wherein the system is implemented on a web server hosting the another web application and the processor is further configured to:
receive a particular http request from the another requesting computing device to access a particular resource identifier associated with the another web application hosted by the web server;
determine that the first prediction output by the first machine learning system of whether the another requesting computing device is malicious exceeds a first threshold;
determine that the second prediction output by the second machine learning system exceeds a second threshold, the second prediction reflecting a risk that the another web application is vulnerable when accessed via the particular resource identifier; and
provide an alert identifying the particular type of attack to an owner of the another web application, wherein the alert is raised programmatically when the particular http request is received.

3. The system of claim 2, wherein the processor is further configured to:
detect a valid response code returned from the another web application to the another requesting computing device; and
generate the alert responsive to detecting the valid response code.

4. The system of claim 1, wherein at least one feature of the second set also reflects port scanning patterns associated with the web applications identified as vulnerable.

5. The system of claim 1, wherein at least one feature of the first set reflects an http response status code.

6. The system of claim 1, wherein at least one feature of the first set reflects port scanning patterns by the requesting computing devices that are identified as malicious.

7. The system of claim 1, wherein at least one feature of the first set or the second set reflects existence of a referrer page.

8. The system of claim 1, wherein at least one feature of the first set or the second set reflects behavior of individual requesting computing devices when accessing subscriptions.

9. The system of claim 1, wherein in a prediction phase, vulnerability of resource identifiers is not a feature of the first set or the second set.

10. A method, comprising:
extracting a first set of features from a server log;
using the first set of features to train a first machine learning system to output first predictions of whether requesting computing devices are malicious;
extracting a second set of features from the server log;
using the second set of features to train a second machine learning system to output second predictions of whether a plurality of different web applications are vulnerable;
receiving a particular request from a particular requesting computing device to access a particular resource locator;
obtaining a particular first prediction, output by the first machine learning system, of whether the particular requesting computing device is malicious;
obtaining a particular second prediction, output by the second machine learning system, of whether a particular web application accessible via the particular resource locator is vulnerable, wherein the particular web application is hosted by a web server that also hosts one or more other web applications;
based at least on the particular first prediction and the particular second prediction, determining whether the particular request involves an attack on the particular web application; and
in an instance when the particular request is determined to involve an attack on the particular web application, providing an alert to an entity associated with the particular web application,
wherein at least one feature of the first set or the second set reflects entropy of character distribution of multiple web site names associated with a plurality of resource identifiers in the server log, the entropy reflecting relative similarity of respective web site names to other web site names.

11. The method of claim 10, wherein the attack is previously unknown.

12. The method of claim 11, wherein the first machine learning system comprises a first gradient boosted tree and the second machine learning system comprises a second gradient boosted tree.

13. The method of claim 10, wherein the alert is raised programmatically when the particular request is received.

14. The method of claim 10, wherein the alert is generated in response to the particular web application returning a valid response code to the particular requesting computing device.

15. A system comprising:
a memory connected to at least one processor, the at least one processor configured to implement a web server, the web server configured to:

receive a request from a particular requesting computing device to access a particular web application via a particular resource identifier, the particular web application being one of a plurality of web applications hosted by the web server;

using a first trained machine learning system, obtain a first prediction of whether the particular requesting computing device is malicious;

using a second trained machine learning system, obtain a second prediction of whether the particular web application hosted by the web server is vulnerable; and in an instance when the first prediction indicates that the particular requesting computing device is malicious and the second prediction indicates that the particular web application is vulnerable, output an alert to an entity associated with the particular web application, wherein the first trained machine learning system or the second trained machine learning system has been trained using at least one feature that reflects:

first scanning patterns where individual requesting computing devices access multiple subscriptions, and second scanning patterns where other requesting computing devices access a single subscription multiple times.

16. The system of claim 15, wherein the first trained machine learning system has been previously trained using one or more other features indicating that a particular malicious requesting computing device employs a common attack methodology on multiple targets to exploit a particular vulnerability.

17. The system of claim 16, wherein the one or more other features indicate that the particular malicious requesting computing device accesses a resource locator prefix on a plurality of different web sites.

18. The system of claim 15, wherein the alert is output responsive to a valid response code being provided to the particular requesting computing device by the particular web application.

19. The system of claim 15, wherein the first trained machine learning system and the second trained machine learning system have been trained using one or more other features that reflect at least:

an http response status code, entropy of character distribution of web site names, existence of a referrer page, and a requesting user-agent.

20. The system of claim 15, wherein the processor is configured to train at least one of the first trained machine learning system or the second trained machine learning system.

* * * * *